United States Patent Office 3,637,814
Patented Jan. 25, 1972

3,637,814
LIQUID NITROSO RUBBER PREPOLYMERS
Nathan Mayes, Ironia, and Ronald Michaels, Boonton, N.J., assignors to Thiokol Chemical Corporation, Bristol, Pa.
No Drawing. Filed Mar. 27, 1968, Ser. No. 716,360
Int. Cl. C07c 81/081, 3/24
U.S. Cl. 260—487
9 Claims

ABSTRACT OF THE DISCLOSURE

Liquid nitroso rubber prepolymers are disclosed having a molecular weight below about 20,000 and the general formula:

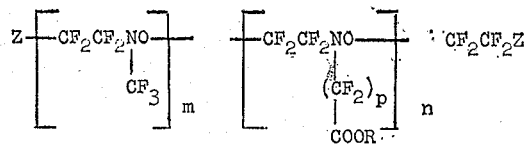

wherein R is selected from hydrogen and alkyl groups of 1 to 6 carbon atoms, Z is selected from chlorine, bromine, iodine and —NO$_2$, $p$ is 2 to 6 and the ratio $m:n$ is from 1:1 to 50:1. The liquid prepolymers may be prepared by copolymerizing perfluoronitrosomethane, tetrafluoroethylene and a nitrosoperfluoro acid or ester in the presence of a terminator which may be chlorine, bromine, iodine or nitrogen dioxide. The polymers can be cured with such curing agents as epoxides, metal oxides and chromium perfluoroacetate to produce rubbers having good physical properties and chemical resistance.

---

This application relates to nitroso rubbers and more particularly to liquid nitroso rubber prepolymers capable of being cured to rubbery solid polymers, as well as to a process for making such liquid prepolymers.

In recent years there has been an increasing interest in nitroso rubbers because of their exceptional resistance to solvent and chemical attack. They are particularly outstanding in their resistance to attack by strong oxidizing agents and are of interest as materials for making gaskets, diaphragms, flexible containers, etc. that are to be exposed to such oxidizing agents. Typical applications are propellant systems wherein one of the components is a strong oxidizer, and systems wherein highly fluorinated reagents are used.

The earlier types of nitroso rubbers were commonly made by copolymerization of tetrafluoroethylene and trifluoronitrosomethane. While such copolymers have the desired chemical properties, their physical properties leave something to be desired, and they cannot be readily cured or vulcanized to achieve a rubber having acceptable strength and elastic properties. To overcome this deficiency it has been proposed that the monomer mixture used be modified by incorporating therein a minor amount of a nitroso termonomer having a functional group through which the polymer can be cured. More particularly, it has been suggested that a nitroso perfluorocarboxylic acid be incorporated in the polymerization reaction mixture to produce a rubbery polymer having pendant carboxyl groups through which the polymer can be cured or vulcanized to improve its physical properties.

While such curable rubbers are useful for many of the applications noted above, there are other applications, such as sealing or potting applications, where it is desirable to have a rubber prepolymer in liquid form capable of being cast or otherwise caused to flow into an irregular confined space and thereafter converted into a rubber. So far as we are aware, readily curable nitroso rubbers have not previously been prepared in fluid form.

It is accordingly an object of the present invention to provide a liquid nitroso rubber prepolymer readily capable of being cured to a nitroso rubber having good physical properties. It is another object of the invention to provide a novel process for producing such prepolymers. It is still another object of the invention to provide a process wherein the viscosity of the product prepolymer can be readily controlled to yield a prepolymer having a predetermined desired fluidity. Other objects and advantages of the invention will be in part obvious and in part pointed out hereafter.

The objects and advantages of the present invention are achieved in general by polymerizing, under the conditions described below, tetrafluoroethylene, a fluoronitrosoalkane and a termonomer of the formula

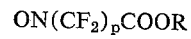

wherein $p$ is 2 to 6 and R is hydrogen or an alkyl group of 1 to 6 carbon atoms, in the presence of a minor amount of a radical chain terminator selected from halogens, alkyl halides, nitric oxide and nitrogen dioxide. While any of various fluoronitrosoalkanes can be used, optimum properties are usually achieved by employing a perfluoronitroso alkane. Trifluoronitrosomethane, the simplest and least expensive member of this group is preferred.

As indicated by the above formula, that termonomer may be either an acid or an ester. Thus it may be nitrosoperfluoropropionic acid, or the corresponding butyric, pentanoic, hexanoic or heptanoic acid, or an alkyl ester of such an acid. The methyl or ethyl ester is preferred. The acids may be prepared as described in U.S. Pat. 3,192,247 and the esters may be prepared as described in Paustian et al. application Ser. No. 569,797, filed Aug. 3, 1966.

As indicated above, the terminator may be a halogen such as elemental chlorine, bromine or iodine, a perfluoroalkyl halide, preferably a halide wherein the alkyl group contains 1 to 4 carbon atoms, e.g., perfluoromethyl chloride, perfluoroethyl bromide or perfluoroethyl iodide, or nitric oxide or nitrogen dioxide. The terminator is desirably used to the extent of 1 to 10 mol percent based on the total moles of monomer in the polymerization reaction mixture. The preferred terminator is elemental chlorine since, as pointed out in further detail hereafter, it has been found that by using chlorine a relatively high degree of control of the fluidity of the product polymer can be achieved by varying the amount of chlorine used.

The polymerization reaction can be carried out in bulk or in an inert organic reaction medium, e.g., methylene chloride or acetone or in an aqueous suspension at a temperature of —60° C. to 50° C. The type of polymerization reaction used depends in some measure on the nature of the terminator and of the termonomer employed. Thus if the termonomer is an acid rather than an ester, the polymerization should be effected in a water-free medium. Also the use of an aqueous suspension is undesirable in cases in which nitrogen dioxide is used as a terminator, since the nitrogen dioxide reacts with the water phase of the suspension. The molar ratio of trifluoronitrosomethane, tetrafluoroethylene and termonomer in the reaction mixture are preferably in the range 1:2:1 to 1:1.02:0.02. The polymerization reaction period may be 20 to 150 hours but is usually between 48 and 90 hours.

The modification of the present process wherein polymerization is carried out in a liquid reaction medium such as methylene chloride may be characterized as a solution-precipitation reaction. The termonomer and methylene chloride are combined in a reaction vessel of appropriate size. The vessel is then sealed and is evacuated of air by the freeze-thaw method. The mixture is cooled to —196° C. and the necessary quantities of $CF_3NO$ and $C_2F_4$ are introduced to the reactor by condensation at liquid nitrogen temperature (−196° C.). The terminator, e.g., elemental chlorine or nitrogen dioxide is introduced in the same manner and the mixture is warmed to −40° C. to 0° C. to initiate the reaction. The polymer formed is insoluble in the reaction medium and hence forms a separate liquid phase. Since the polymerization continues in this separate phase, the reaction is in part a bulk polymerization. One disadvantage of this solution-precipitation process is that because of the exothermic character of the reaction, there is a tendency for the temperature of the mass of liquid polymer to build up, thereby making it difficult to produce a polymer having a given predetermined desired viscosity.

Improved heat removal from the polymer can be achieved in some instances by using acetone in place of methylene chloride. In cases where the proportion of termonomer exceeds about 10 mole percent of the monomer mixture, the polymer formed is acetone—soluble and remains dissolved in the reaction medium. However, where smaller amounts of termonomer are used, separation of the polymer occurs as in the case in which methylene chloride is used as a reaction medium.

The preferred modification in most cases involves suspension polymerization wherein the monomers and polymer are maintained as the disperse phase of an aqueous suspension throughout the reaction period by using a suitable suspending agent with agitation. A typical suspending agent useful in carrying out the present process is magnesium carbonate. As pointed out above, an ester-type termonomer should be used in this aqueous process and the preferred terminator is elemental chlorine.

Further details of the polymerization process are given in the specific examples below.

The polymerized products of the present process are liquid nitroso rubber prepolymers having molecular weights below about 20,000 and viscosities ranging from 1,000 to 300,000 centipoise (cp.) at 25° C. They may be represented by the following general formula:

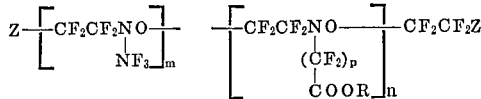

wherein R is hydrogen or an alkyl group of 1 to 6 carbon atoms, Z is halogen, a perfluoroalkyl radical, —NO or —$NO_2$, p is 2 to 6 and the ratio m:n is from 1:1 to 50:1. In cases where an ester termonomer is used, the ester groups are desirably converted to acid groups prior to cure. Hydrolysis can be effected by mixing the ester terpolymer with a suitable solvent, e.g., acetone and a dilute mineral acid, e.g., hydrochloric acid, and heating at reflux for several hours. The mineral acid is then removed by washing with water.

The liquid terpolymer can be cured through the carboxyl groups thereof by reaction with any of various curing agents. Good results have been obtained with polyepoxides, tri-valent chromium salts of organic acids, e.g., chromium, tri-fluoroacetate and metal oxides, e.g., magnesium oxide. Illustrative examples of curing procedures are given in the specific examples wherein the tensile strengths and elastic properties of the cured polymers are indicated.

In order to point out more fully the nature of the present invention, the following specific examples are given of illustrative embodiments thereof.

EXAMPLE 1

Nitrosotrifluoromethane (4.65 g., 0.047 mole), tetrafluoroethylene (5.0 g., 0.05 mole), $ON(CF_2)_3COOH$ (0.56 g., 0.0025 mole), and $NO_2$ (0.23 g.) were charged to a Pyrex ampule containing 20 ml. of methylene chloride. The ampule was sealed and agitated at −5° C. for 18 hours. Upon opening the ampule and removing volatile products and solvent, 9.1 g. of liquid polymer of viscosity 6800 cp. at 25° C. was obtained. Titration of the product showed that it contained 4.55 mole percent acid. Infrared and $F^{19}$ N.M.R. analysis indicated the structure to be:

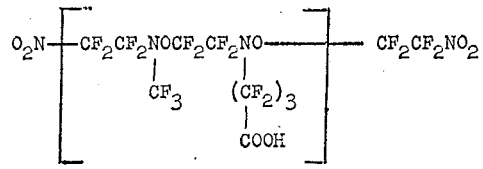

3.0 g. of liquid carboxy terpolymer as thus prepared was stirred with 0.15 g. of magnesium oxide for a period of five minutes. This mixture was then spread as a film on a sheet of Teflon FEP polymer at a thickness of approximately 30 mils. The film was placed in a vacuum oven at 50° C. and degassed at 1.0 mm. Hg pressure. After five hours at this temperature the film was cured to a tack free elastomer state. Measurement of mechanical properties on an Instron Tensile Tester showed it to have 580 p.s.i. tensile strength and 150 percent elongation.

EXAMPLE 2

13.86 g. (0.14 mole) of $CF_3NO$, 20 g. (0.20 mole) of $CF_2$=$CF_2$, 14.34 g. (0.06 mole) of $ON(CF_2)_3COOCH_3$, and 0.092 g. of $NO_2$ were charged to a Pyrex ampule containing 100 ml. of methylene chloride. The ampule was sealed and agitated at 0° C. for 90 hours to obtain 42.5 g. of yellow liquid polymer of viscosity 22,500 cp. at 25° C. Infrared and $F^{19}$ N.M.R. analyses indicated the structure of the product to be:

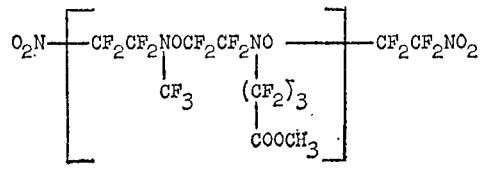

The ester polymer was hydrolyzed to acid polymer. A mixture of 28 g. of polymer, 140 ml. of acetone and 90 ml. of 0.1 N HCl was heated at reflux with stirring for 16 hours. The product was isolated and washed with water to yield 26 g. of liquid of 48,000 cp. viscosity at 25° C. Infrared analysis indicated that conversion of ester to acid was complete. A titration showed the product to contain 12.6 mole percent acid.

The acid liquid polymer was cast to a film, which was cured and subjected to physical property measurements. 4 g. of the hydrolyzed polymer was mixed with 0.66 g. of UNOX-207X (dicyclopentadiene dioxide) and spread on Teflon FEP film with a doctor blade to a thickness of 30 mils. The film was cured by heating for 10 hours at 90° C. The cured film had tensile strength of 980 p.s.i., elongation of 75% and hardness (Shore A) of 72.

EXAMPLE 3

8 g. (0.08 mole) of $CF_3NO$, 10 g. (.010 mole) of $CF$=$CF_2$, 4.78 g. (0.02 mole) of $ON(CF_2)_3COOCH_3$, and 0.46 g. of nitric oxide were charged to an ampule containing 40 ml. of a solution of 26 g. of LiBr and 1 g. of $MgCO_3$ in 50 g. of water. The ampule was sealed and agitated at −25° C. for 60 hours. The polymer product was obtained as a suspension which coagulated upon addition of hydrochloric acid. The product, after washing with water and drying was a viscous liquid. Infrared analysis indicated the structure to be that of the ester terpolymer.

EXAMPLE 4

86.5 g. (0.865 mole) of $CF_2$=$CF_2$, 68.5 g. (0.693 mole) of $CF_3NO$, 41.5 g. (0.173 mole) of $$ON(CF_2)_3COOCH_3$$

and 3.98 g. of $NO_2$ were charged to an ampule containing 400 ml. of acetone. The ampule was sealed and shaken for 90 hours in a liquid bath at −40° C. Upon removal of solvent and volatile products there was obtained 172 g. of viscous liquid polymer. Infrared analysis indicated the structure to be that of the ester terpolymer containing $NO_2$ terminal groups.

170 g. of the liquid polymer was added to 425 ml. of water and the mixture was stirred and heated at 70° C. for 48 hours. The water phase was then decanted to leave 151 g. of viscous liquid polymer. Infrared analysis indicated that ester groups had been completely converted to acid. Titration of a sample revealed an acid content of 8.1 mole percent.

EXAMPLE 5

$CF_3NO$ 75.735 g., (0.7650 mole), $CF_2=CF_2$ (90 g., 0.9 mole), $ON(CF_2)_3COOH$ (30.375 g., 0.1350 mole), and $Cl_2$ (7.688 g., 0.108 mole) were condensed into a 1000 ml. heavy-walled Pyrex polymerization vessel containing 406 ml. of methylene chloride. The vessel was sealed and agitated for 90 hours at −40° C. Upon opening of the vessel and removing the volatile products and solvent, 177 g. of liquid polymer of viscosity 6300 cp. at 60° C. (Brookfield) and molecular weight of 4620 was obtained. Titration of the product indicated that it contained 6.08 mole percent of acid.

2.0 g. of liquid carboxy terpolymer as thus prepared was mixed with 0.16 g. of finely pulverized chromium-trifluoroacetate for a period of five minutes. A film of approximately 30 ml. thickness was spread upon a sheet of Teflon FEP polymer. This film was placed in an oven at 50° C. and after 16 hours the temperature was increased to 90° C. for four hours after which time the film was removed and observed to be fully cured. The tensile strength was 660 p.s.i. and elongation was 150 percent.

EXAMPLE 6

As pointed out above, the use of chlorine as a terminator is especially advantageous since it provides a means whereby the viscosity of the product polymer can be readily controlled. In order to indicate the relationship between concentration of the chlorine terminator and product polymer viscosity, a series of polymers was prepared in accordance with the procedure of Example 5 except that the terminator concentration was varied and two different termonomer concentrations were used. The results are given in Table I below wherein the termonomer and terminator concentrations and acid content are given in mole percent, the yield in percent and the viscosity as cp. 60° C. measured in a Ferranti-Shirley viscometer.

TABLE I

| Termonomer charged | Terminator concentration | Yield | Acid content | Viscosity |
|---|---|---|---|---|
| 10 | 1 | 86 | 9.90 | 135,000 |
|  | 2 | 92 | 9.28 | 60,000 |
|  | 3 | 94 | 9.43 | 30,000 |
|  | 4 | 90 | 9.44 | 22,500 |
|  | 5 | 95 | 10.10 | 16,000 |
|  | 6 | 95 | 9.30 | 10,000 |
|  | 7 | 94 | 8.8 | 10,000 |
| 7.5 | 1 | 89 | 7.1 | 93,000 |
|  | 3 | 91 | 7.2 | 23,000 |
|  | 4 | 93 | 7.5 | 9,500 |
|  | 6 | 85 | 6.8 | 4,500 |
|  | 11.3 | 74 | 7.8 | 2,500 |

EXAMPLE 7

A liquid polymer was prepared using a 500 ml. Pyrex vessel as a reactor. $CF_3NO$ (42.07 g., .425 mole), $CF_2=CF_2$ (50 g., .5 mole), $ON(CF_2)_2COOH$ (13.125 g., .075 mole), and chlorine (4.26 g., .06 mole) were charged to the reactor which had previously been charged with 200 mls. of reagent grade methylene chloride that had been previously degassed by the freeze-thaw method. The gaseous monomers were condensed into the reactor at −196° C. After all the ingredients were charged, the reactor was sealed and placed into a liquid bath at −40° C. and shaken for 90 hours. Upon removal from the cold bath the reactor was opened and the volatile products were removed. The remaining polymer was a clear, colorless, viscous liquid which weighed 82 grams. This material had a viscosity of 160,000 cp. at 25° C. The infrared analysis indicated the desired acid polymer had formed. Titration indicated 6.5 mole percent of acid present.

EXAMPLE 8

Nitrosotrifluoromethane (4.65 g., 0.047 mole), tetrafluoroethylene (5 g., 0.05 mole), $ON(CF_2)_3COOH$ (0.56 g., 0.0025 mole), and $CCl_4$ (.768 g., .005 mole) were charged to a Pyrex reaction vessel. The gases were charged at −196° C. The vessel was sealed and placed in a liquid bath at −40° C. The reactor was shaken for a period of 90 hours. Upon removal of volatile products and solvent there remained liquid polymer of weight 7.2 g. and viscosity of 175,000 cp. at 25° C. (Brookfield). Infrared analysis revealed it to be the carboxy terpolymer. Titration indicated an acid content of 2.1 mole percent.

EXAMPLE 9

$CF_3NO$ 7.57 g. (0.0765 mole), $CF_2=CF_2$ 9.0 g. (0.09 mole), $ON(CF_2)_3COOH$ (3.0375 g., 0.0135 mole) and iodine (1.37 g., .0054 mole) were combined in a 200 ml. reactor tube with 40.6 ml. of methylene chloride. The gas charges were performed at −196° C. The reactor was placed in a −40° C. liquid bath and shaken for 90 hours. Upon opening of the vessel and removal of the volatile products and solvent, 17 g. of liquid polymer of viscosity 7500 cp. at 60° C. (Brookfield) was obtained. Titration of the product indicated an acid content of 5.7 mole percent.

It is of course to be understood that the foregoing examples are intended to be illustrative only and that numerous changes can be made in the ingredients, proportions and conditions set forth therein without departing from the spirit of the invention as defined in the appended claims.

We claim:

1. A process for making a curable liquid nitroso prepolymer which comprises polymerizing perfluoronitrosomethane, tetrafluoroethylene and $ON(CF_2)_pCOOR$ wherein $p$ is 2 to 6, R is hydrogen or an alkyl group of 1 to 6 carbon atoms, in a molar ratio between 1:2:1 and 1:1.02:0.02 in the presence of 1 to 10 mole percent, based on the total weight of monomer, of a radical chain terminator which is chlorine, bromine, iodine or —$NO_2$, at a temperature of −60° to 50° C., and recovering the resulting liquid polymer from reaction mixture.

2. A process according to claim 1 carried out in a reaction medium which is methylene chloride.

3. A process according to claim 1 carried out in a reaction medium which is acetone.

4. A process according to claim 1 and wherein the polymerization reaction is carried out in aqueous suspension, R is an alkyl group and the terminator is chlorine, bromine or iodine.

5. A process according to claim 4 and wherein the terminator is chlorine.

6. A process according to claim 1 and wherein the polymerization reaction is carried out in methylene chloride as a reaction medium and the terminator is chlorine.

7. A curable liquid nitroso prepolymer having a molecular weight below about 20,000, a viscosity of 1,000 to 300,000 cp. at 25° C. and a structure represented by the general formula:

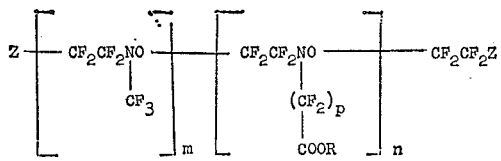

wherein R is selected from hydrogen and alkyl groups of 1 to 6 carbon atoms, Z is chlorine, bromine, iodine or $-NO_2$, $p$ is 2 to 6 and the ratio $m:n$ is 1:1 to 50:1.

8. A liquid prepolymer according to claim 7 wherein R is hydrogen, $p$ is 2 and Z is chlorine.

9. A liquid prepolymer according to claim 7 wherein R is hydrogen, $p$ is 3 and Z is chlorine.

References Cited

UNITED STATES PATENTS

| 3,472,822 | 10/1969 | Oliver et al. | 117—161 X |
| 3,427,279 | 2/1969 | Green et al. | 260—92.1 X |
| 3,399,180 | 8/1968 | Crawford | 260—92.1 |
| 3,321,454 | 5/1967 | Crawford | 260—92.1 |
| 3,213,050 | 10/1965 | Rice | 260—87.5 AX |
| 3,072,625 | 1/1963 | Borders | 260—92.1 |
| 3,072,592 | 1/1963 | Crawford | 260—92.1 X |

OTHER REFERENCES

Migrdician Organic Synthesis, vol. 1, pp. 336–337.

LEWIS GOTTS, Primary Examiner

J. L. DAVISON, Assistant Examiner

U.S. Cl. X.R.

260—80.73, 87.1, 92.1